INVENTOR.
J. H. HOEKSEMA
BY
C. T. Parker and W. A. Murray
ATTORNEYS

Aug. 18, 1959  J. H. HOEKSEMA  2,899,792
CORN HARVESTER

Filed Feb. 14, 1958  3 Sheets-Sheet 3

INVENTOR.
J. H. HOEKSEMA

ATTORNEYS

United States Patent Office 2,899,792
Patented Aug. 18, 1959

2,899,792
CORN HARVESTER

Joe H. Hoeksema, Des Moines, Iowa, assignor, by mesne assignments, to Deere & Company, a corporation of Delaware Application February 14, 1958, Serial No. 715,254

9 Claims. (Cl. 56—18)

This invention relates to a corn harvester attachment used in combination with a conventional combine. More particularly this invention relates to a mounting attachment or structure for mounting a conventional type corn harvester attachment to a conventional type combine.

In U.S. Patent 2,794,307, issued July 4, 1957, to Charles S. Morrison, Henry H. Denison, and Frank D. Jones, there is therein provided a harvester attachment adapted for mounting on the forward end of and as a replacement for the header on a large self-propelled combine. The corn harvester attachment is composed of a pair of row crop harvesting units which detach the ears from the stalks and move the ears inwardly to a centrally positioned auger-type conveyor which in turn feeds the ears rearwardly to an opening in the forward end of the combine. In a large combine of a self-propelled type, there is inherent in the combine a strong structural framework which in and of itself may support the corn picker attachment without affecting or injuring the combine body and structure. In the present invention it is contemplated to mount the conventional type corn harvester on a relatively small combine, which in this particular instance, will be a pulled-type combine. Such a combine is normally of relatively light weight construction, and as such, the frame structure of the combine body is not sufficient to provide a base for direct connection between a corn picking attachment and the body. Consequently, it has been impractical to consider mounting such a picking attachment to the body part of the lighter weight combine.

It is the purpose of the present invention to provide an attachment for use with a light weight combine which is so mounted on the combine so as to receive its basic support from the main frame of the combine and which provides direct connection to the corn harvester. It is contemplated that this will be done by providing an attachment frame composed of a pair of transversely spaced elongated frame members, part of which will extend beneath the main frame of the combine and will be attached thereto, and part of which will extend upwardly from the previous part forwardly of the combine body, the latter part having at its upper end trunnion receiving means for receiving horizontally alined trunnions on the corn harvester. Hydraulic units on the lower portion of the forward part of the attachment frame will operate to effect vertical movement of the harvesting unit about the trunnion means. Therefore, the harvesting unit will be supported directly by the main frame of the combine and will not in any manner, other than to close the necessary openings and fittings, be connected directly to the combine body.

Other objects and advantages of the invention will become apparent to those skilled in the art as the nature of the invention is fully understood from the following disclosure and as shown in the accompanying drawings.

Fig. 6 is a schematic view showing a portion of the drive for operating the combine and the corn harvester.

Figure 1:
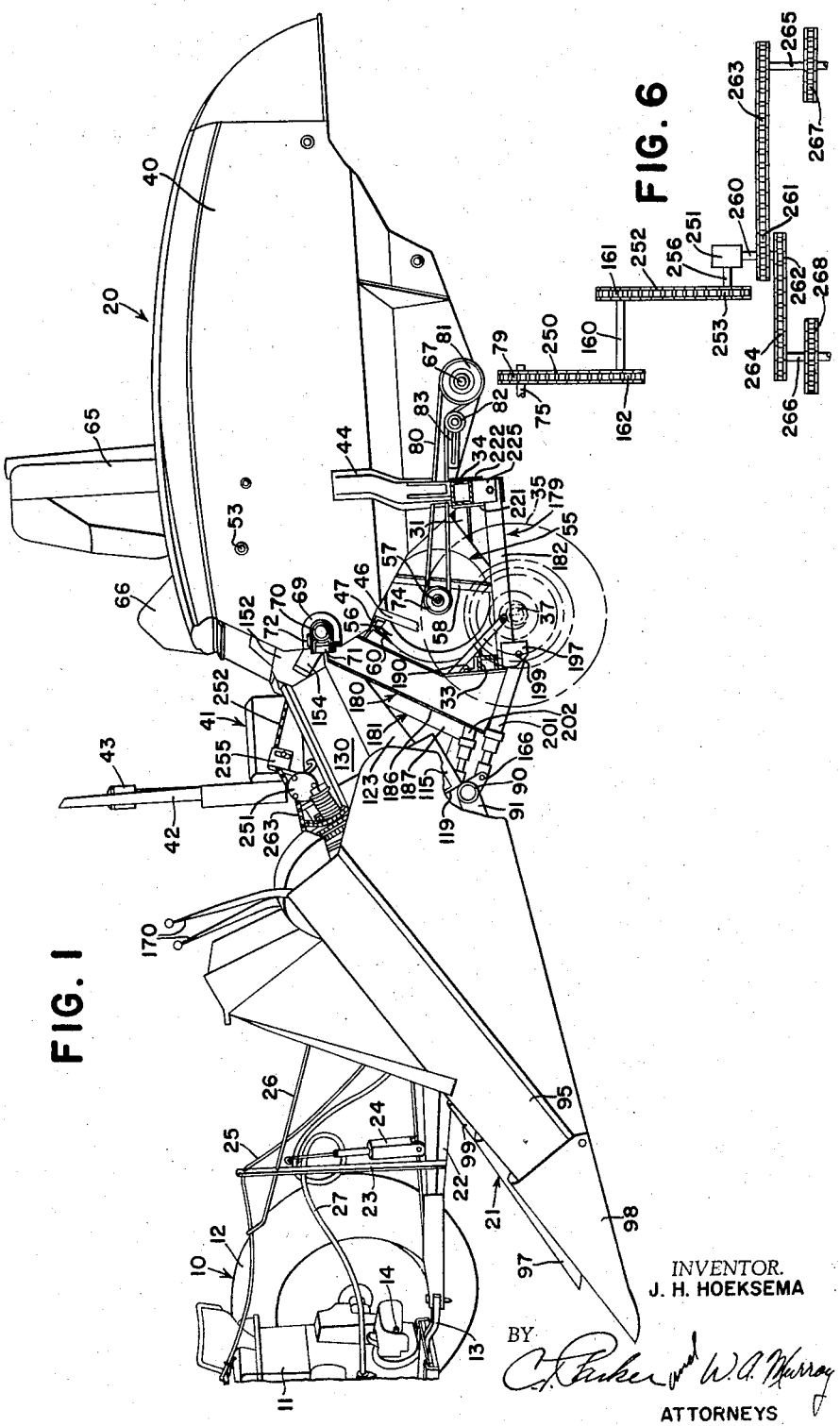
Fig. 1 is a left side perspective, partially in section, of the rear portion of a tractor and the associated corn harvester and combine assembly. For purposes of clarity, portions of the combine are shown in representative form.

Fig. 1 shows a tractor 10 having a tractor body 11 supported at its rearward end by a pair of transversely spaced traction wheels, one of which is shown at 12. The tractor 10 is characterized by having a hydraulic system carried in the body 11 and a trailing drawbar 13 for connection to and for supporting the forward portion of a drawn implement. A power take-off shaft 14 is also provided on the tractor. It should be noted that many types of drawn combines are driven directly from the power take-off shaft, and while in this particular instance there is preference shown for a self-powered combine, it should be recognized that such is shown only as a matter of convenience and that any other type of drawn combine or light weight combine would operate for purposes of the present invention in a manner similar to the one here shown.

The assembly pulled by the tractor includes a combine 20 with the conventional type header removed and replaced by a forwardly extending corn picking attachment, indicated in its entirety by the reference numeral 21. The combine is connected directly to the tractor drawbar 13 by means of a forwardly extending rigid draft member 22. The draft member 22 supports a pair of upright arms or brackets 23, 24 which in turn support operating control mechanism in the form of a drawcord 25 and rod 26 which controls the operating mechanism on the combine. The bracket 24 supports a hydraulic hose 27 extending between the tractor 10 and the combine 20.

The combine 20 has a main frame indicated in its entirety by the reference numeral 30. The frame 30 is composed of fore-and-aft extending inner and outer channel members 31, 32 interconnected at their forward ends by a transverse portion or beam 33, and at their rearward ends by a transverse portion or beam 34. The frame portions or members 31—34 are all rigidly held together, generally by welding, not shown, to form the main frame 30 positioned to support the combine from underneath. The frame 30 is supported at its forward end, as previously mentioned, by the tractor drawbar and a pair of transversely spaced wheels, the left wheel 35 being indicated in dotted representation in Fig. 1 and shown partially in Figs. 2 and 3 and the right wheel not being shown. Extending outwardly from the outer fore-and-aft channel member 32 is a bracket 36, the outer end of which provides supporting structure and connecting means for mounting the wheel axle 37 of the wheel 35 on the main frame 30. The exact manner of mounting the axle 37 on the bracket 36 is not shown but is conventional.

The combine 20 also includes a fore-and-aft extending elongated body indicated generally by the combine housing 40 which is positioned between the support wheels. The body 40 is carried on the main frame 30. The combine 20 also includes its own power source in the form of an internal combustion engine, indicated in its entirety by the reference numeral 41, having an exhaust pipe 42 and air intake 43. The body 40 of the combine 20 is supported on the main frame 30 by structure such as the upright bracket supports 44 which supports the underside of the housing 40. Other supporting frame work includes transversely spaced and generally upright angle iron members 45, 46 fixed to opposite ends of the forward transverse frame member 33 and extending upwardly to be connected to various portions of the combine, one of which includes a transverse angle iron 47 which supports the forward end of the combine body 40.

Figure 2:
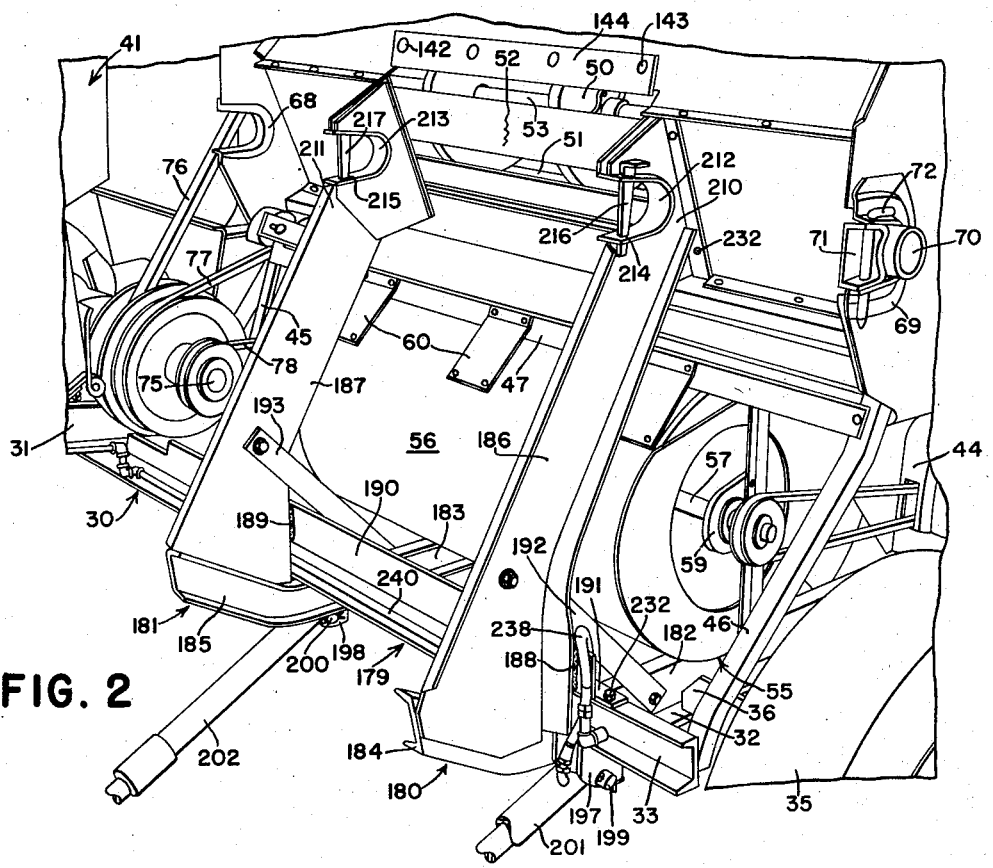
Fig. 2 is a perspective view taken from the front and left of the combine showing the attachment frame connected thereto.
Figure 3:
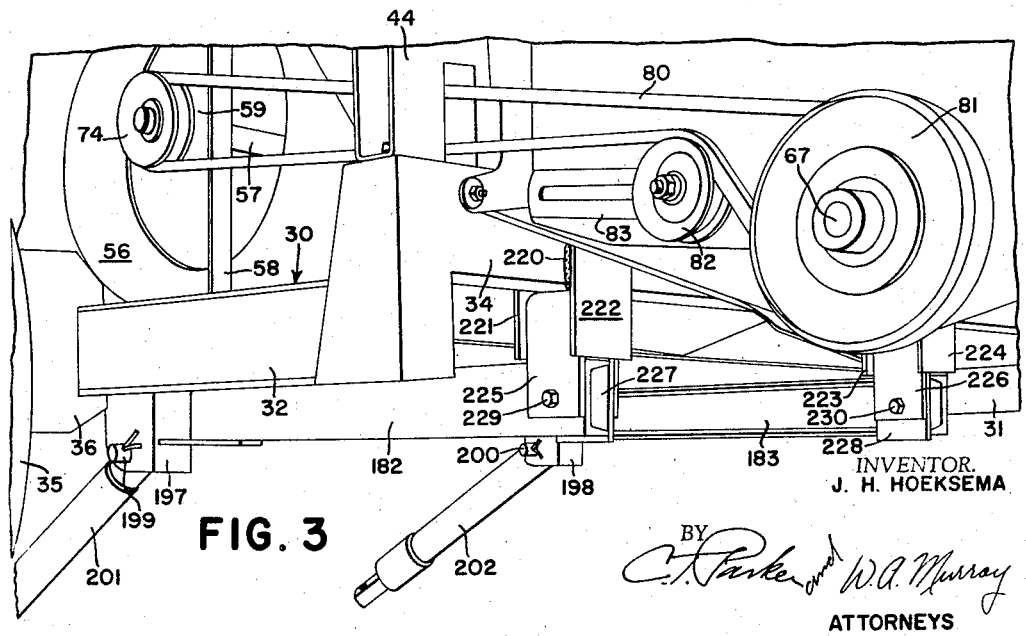
Fig. 3 is a rear and left side perspective view looking upwardly into the lower portion of the combine and showing the attachment frame connected thereto.
Figure 4:
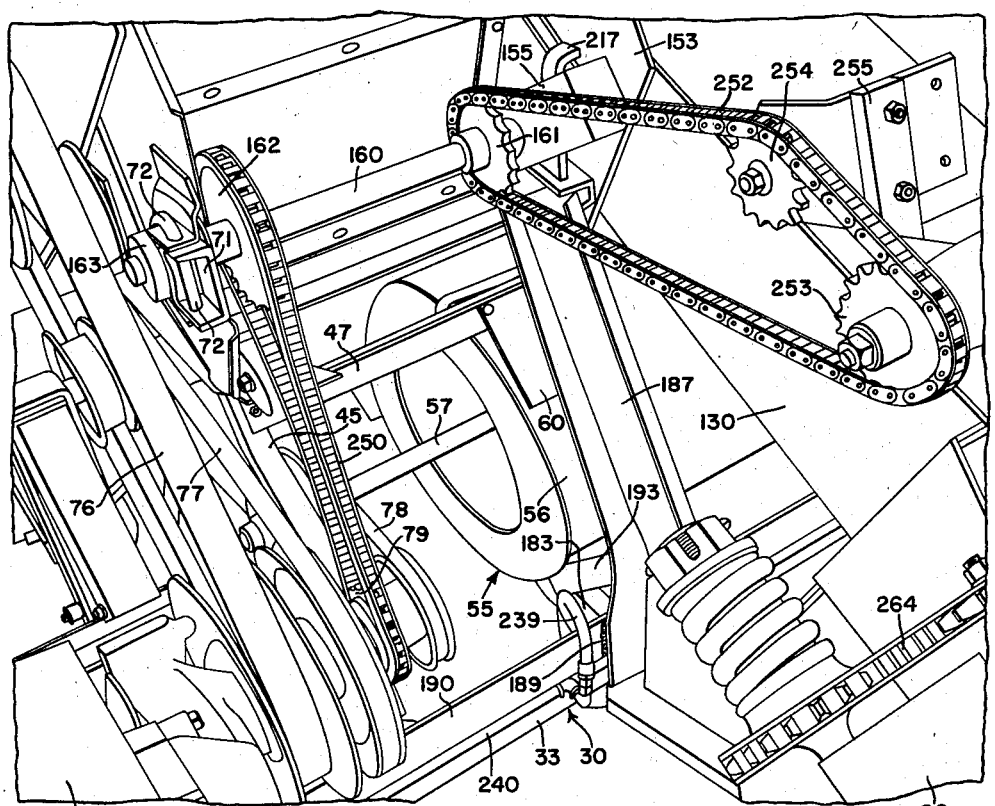
Fig. 4 is a perspective view taken from the right and forward of the combine and looking down into the forward portion of the combine and rear portion of the harvesting unit.

Operating mechanism within the combine is shown partially in Fig. 2 and includes a conventional combine cylinder 50 and associated concave 51 seen through a crop-inlet 52 (Fig. 2). The cylinder 50 is mounted on a drive shaft 53 extending across the forward end of the body 40. Also provided is a blower 55 which includes a blower housing 56 and a drive shaft 57 on which is mounted the fan blades, not shown, for creating the draft for the blower. The housing 56 is carried on the transverse angle iron 47 by means of hanger brackets 58. The drive shaft 57 is supported from its left and right end and, as shown in Fig. 2, is supported at its left end by means of an angle iron 58 fixed to the left end of the lower housing 56, which carries a bracket 59 having a journal for receiving the left end of the drive shaft 57. Hanger brackets 60 support the housing 56 from the transverse beam 47. The combine has a pair of discharge elevators 65, 66, one of which feeds into a grain tank on the right side of the combine, which is not shown, and the other elevator 66 of which discharges the grain from the grain tank. Also provided is a transverse auger, not shown, the position of which is shown by the auger drive shaft 67. The auger operates to feed the grain harvested in the combine to the elevator 65.

Provided on the forward end of the combine is structure 68, 69 forming forwardly opening trunnion receiving means which is normally used to mount the conventional type header on the combine. On the left trunnion means 69 is structure for mounting the header trunnion in the form of a short bushing 70 and a bushing bracket 71 which operates to mount the bushing 70 in the trunnion receiving structure 69 by means of a drop pin 72.

The drive for operating the combine includes a main drive shaft 75 driven directly from the main power source 41, which has three pulleys mounted thereon, one of which operates a heavy duty V-belt 76 extending upwardly from the shaft 75 to drive the cylinder drive shaft 52. A second V-belt 77 extends upwardly for purposes of driving the beater and other mechanisms of the combine. A third V-belt 78 extends rearwardly and operates to drive the blower drive shaft 57. Also mounted on the shaft 75 is a sprocket 79. On the opposite or left end of the shaft 57 is mounted a pulley 74 which operates to drive the auger drive shaft 67 by means of a V-belt 80 and pulley 81 mounted on the shaft 67. An idler or takeup pulley 82 and an associated slotted bracket 83 is provided for take-up in the latter V-belt drive. The exact nature of the drive for the combine is, of course, unimportant for purposes of understanding the present invention. Consequently, such has been described only generally and only to the extent deemed necessary.

It should also be recognized that details of the combine are generally old and now conventional. However, should a further detailed description be desired, such may be obtained by reference to an R. L. Anderson Patent 2,367,990, issued January 23, 1945.

Also, before proceeding further with the description of the corn harvester attachment, it should be recognized that such is described fully and completely in the aforementioned U.S. Patent 2,794,307. Consequently, the attachment will also be described only in general terms, and only to the extent deemed necessary to fully and completely appreciate the principles of the present invention.

Figure 5:
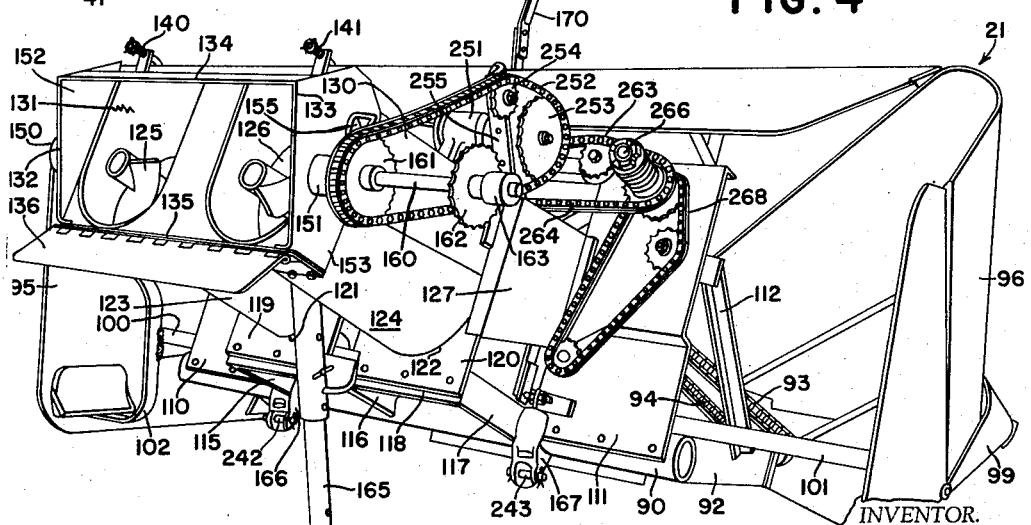
Fig. 5 is a perspective view taken from the right and rear of the corn harvesting unit.

The corn harvester 21 includes a forwardly extending harvesting section having a pair of row units adapted to gather and harvest ears of corn from adjacent rows of stalks. The harvester 21 is supported by a main frame including a transverse beam or member 90 (Fig. 5). A pair of forwardly extending frame members 91, 92 are rigid with and extend forwardly from the beam 90. The frame members 91, 92 support gathering and harvesting structure such as gathering chains 93, 94 which operate to gather and harvest the corn from the stalks. The forwardly extending frame members 91, 92 also support the forward shielding, such as at 95 on the left gathering unit and 96 on the right gathering unit. The shielding for the harvester also includes a centrally located divider point 97 and respective left- and right-hand outer gathering points 98, 99 both of which are hinged for vertical movement to their respective shieldings 95, 96 and a central structure, not shown. The harvesting mechanism itself is conventional and it may be of the type shown and described in detail in the aforesaid Morrison et al. patent. Also provided for supporting the shields 95, 96 are transverse support rods 100, 101 which extend outwardly from the frame members. Suitable braces, such as at 102, are welded to the outer ends of the rods 100, 101, and the shields 95, 96. Shields, 110, 111 are bolted to the transverse beam 90 and extend upwardly to serve as support for the drive mechanism, later to be described in detail. Braces, one being indicated at 112 (Fig. 5), serve as additional support for the shields 110, 111. Three rearwardly extending structural members 115, 116, 117 are fixed to the cross beam 90 and are interconnected at their rear ends by a cross brace 118. Riveted to the cross brace 118 are upwardly extending plates 119, 120, the upper edges of which are formed at 121, 122 to receive the lower surface of auger troughs 123, 124. The troughs 123, 124 support augers 125, 126 which project rearwardly from the forwardly extending harvesting mechanism. Also operating as braces for the plates 119, 120 are fore-and-aft extending brace plates, one of which is shown at 127, which extend from the upright plates 110, 111 to the plates 119, 120 respectively.

The auger troughs 123, 124 and their associated augers 125, 126 serve as part of a centrally located conveyor extending rearwardly from the harvesting mechanism and includes a housing 130, part of which is formed by the auger troughs 123, 124, which encloses the auger conveyors and has a rear crop outlet formed by the edges 132, 133, 134, 135 which are symmetrical and will register with the edges of the crop inlet 52 on the forward end of the combine body. The conveyor housing 130 carries a hinged metal flap 136 at its lower edge 135. Adjacent the upright edge 134 are a pair of thumb nuts 140, 141 which are registrable with openings 142, 143 (Fig. 2) in the plate 144 forming the upper edge of the crop inlet 52 on the combine. The central conveyor also has at its rear end structure forming horizontal and axially alined trunnions 150, 151 extending outwardly from the conveyor housing 130 and on opposite sides thereof. The trunnions 150, 151 are fixed to side plates 152, 153 respectively which are part of the conveyor housing 130. Reenforcing brackets 154, 155 are also provided to aid in support of the trunnions 150, 151. The right trunnion 151 serves as a journaled support for a transversely extending shaft 160 which carries thereon sprockets 161, 162 and at its outer end a second trunnion 163.

Other structure associated with the harvesting mechanism is a stand 165 and a pair of transversely spaced brackets 166, 167 which depend from the transverse tube 90 and receive the ram ends of a pair of hydraulic units. Also provided are lever means, as at 170, and their associated adjusting mechanisms which normally operate to adjust the spacing between snapping rolls, not shown. Other structure, both shown and otherwise, are of conventional nature and are generally fully and completely described in the aforementioned Morrison et al. Patent. Consequently, while the harvester has not been described in detail, it should be generally recognized that it is of the type in which the harvesting unit moves forwardly over a pair of adjacent rows of corn stalks for purposes of removing the ears from the stalks and which feeds the ears inwardly to a central conveyor contained in the housing 130, the conveying mechanism being the augers 125, 126, which operates to move the ears rearwardly to be discharged out of the rear end of the conveyor.

The attachment 179 for mounting the corn harvester on the combine consists basically of an elongated frame composed of a pair of transversely spaced elongated frame structures 180, 181 which includes therein a pair of fore-and-aft spaced apart elongated sections 182, 183 having at their forward ends 184, 185 upwardly extending portions 186, 187. The lower sections 182, 183 form with the upright sections or portions 186, 187 substantially a C-shaped frame and while the sections 182, 183 are separate from the upright sections 186, 187, nevertheless they are rigidly held together by a cross member or beam 190 and in fact may be treated as a single rigid frame having a laterally disposed section composed of the portions 182, 183 positioned beneath the main frame of the combine and a forward upright section proposed of the upright sections 186, 187 positioned forwardly and adjacent the combine body. The frames 180, 181 are composed substantially of relatively strong structural or channel members. Fixed to the flanges of the upright channel members 186, 187 by welding 188, 189, is the angle iron member or beam 190 which has a rearwardly extending portion or flange 191 resting against the top of the transverse frame member 33 of the combine. Also provided as part of the frames 180, 181 are diagonal braces 192, 193 bolted to the fore-and-aft extending portions 182, 183 and the upright portions 186, 187 respectively. Fixed to the outer upright web portions of the fore-and-aft extending sections or portions 182, 183 is a pair of downwardly extending and forwardly opening brackets 197, 198 which are apertured to receive pins 199, 200 which connect to the cylinder ends of hydraulic units 201, 202 respectively. At the upper ends 210, 211 of the upright sections or portions 186, 187 of the frame members 182, 183 are forwardly opening pivot brackets 212, 213 serving as trunnion receiving means. The brackets 212, 213 are of U-shape with the leg portions of the U extending forwardly and having therein apertures as at 214, 215 for receiving pins 216, 217 respectively.

The C-shaped frames 180, 181 are mounted on the combine so as to permit the weight of the corn harvester to be carried directly on the main frame 30 of the combine. Welded, as at 220, to opposite upright faced surfaces of the transverse beam 34 are depending pads or plates 221, 222 on the left end of the beam 34 and 223, 224 on the right end of the beam 34. The depending plates 221, 222 and 223, 224 support between them downwardly opening U-shaped brackets 225, 226, the opposite legs of which depend on opposite sides of the fore-and-aft extending sections or portions 182, 183 of the frame 180. Metal pads 227, 228 are provided adjacent the inner leg of the U-brackets 225, 226 for purposes of closing the opening of the channel portions 182, 183. The frame sections or portions 182, 183 are fixed directly to the U-brackets 225, 226 by means of bolts 229, 230 respectively. The forward ends of the C-shaped main frames 180, 181 are supported on the forward cross beam 33 of the combine main frame 30 by means of the angle iron or beam member 190 which rests against the upper surface of the beam 33 and which is held against lateral or transverse movement by bolts 231. It should be noted that the upper ends 210, 211 of the upright portions 186, 187 are bolted to the combine as for example at 232. The upper connection is however only for purposes of sealing the opening at that point and it should be understood that the bolts 232 do not in any manner carry the load of the harvester thereon.

In mounting the corn picker attachment on the combine, the attachment frame 179 is mounted on the combine main frame 30 by first placing the frame 179 so that the flange 191 of the transverse angle iron member 190 rests against the upper surface of the transverse beam 33. The bolts 229, 230, 231, and 232 are then placed in their respective positions so that the frame 179 is supported both vertically and laterally and so positioned that the upright members or portions 210, 211 are on opposite sides of the conveyor housing 130 of the corn harvester. The entire combine is then moved forwardly so that the U-shaped and forwardly opening brackets or trunnion receiving means 212, 213 contact the trunnions 150, 151 respectively. At the same time, the outer trunnion or pivot 163 on the harvester will seat itself in the bracket or trunnion member 68 on the combine. The pins 216, 217 are then dropped into position, as shown in Fig. 7, so as to lock the trunnions 150, 151 in a pivotal but otherwise fixed position relative to the brackets 212, 213. Also, the pin 72 is dropped into the opening in the trunnion member 69 so as to position the trunnion member 163. At this point, the harvester is mounted on the combine for vertical movement about the axis of the trunnions 150, 151, 163. The hydraulic units 201, 202 are then connected to the depending brackets 166, 167 on the harvester frame and the hydraulic units are connected to their fluid supply which is fed through pipe structure 240 which in turn is connected to the units 201, 202 by flexible hose connections as at 238, 239 respectively. The pipe structure 240 is suitably connected to the hydraulic hose 27. Pins 242, 243 support or connect the forward or ram end of the hydraulic units on the brackets 166, 167 and permit relative vertical movement between the bracket and the ram ends. Thus, the entire harvester may be adjustably moved vertically by the hydraulic units 201, 202 about the axis of the trunnions 150, 151.

The drive mechanism operated to drive the corn harvester receives its power from the main power source on the combine and specifically by means of a chain 250 which extends over the sprockets 79 and 162 when the harvester is attached to the combine. Power is transmitted forwardly from the shaft 160 through the sprocket 161 to a gear transmission, indicated in its entirety by its housing 251, by means of a chain drive including a chain 252, a driven sprocket 253, and idler sprocket 254. The driven gear 253 is mounted on a shaft 256 extending from the gear housing 251. The idler sprocket 254 is mounted on adjustable bracket means 255. A short drive shaft 260 extends forwardly from the transmission housing 251 and has mounted on its forward end sprockets 261, 262. The sprockets 261, 262 operate chain drives 263, 264 which drive outer row unit drive shafts 265, 266 respectively. Mounted on the drive shaft 265, 266 are chain drives 267, 268 which drive a sprocket and shaft rigid with at least one of the snapping rows in each of the harvesting mechanisms. Other drive mechanisms on the harvesting row units are positioned forwardly of the plates 110, 111 and as such are not shown in the present drawings. It should also be recognized that there exists considerable other drive and operating mechanisms not shown or described in the present specification on both the combine and the harvester.

It should also be recognized that the present form of the invention was generally shown and described in detailed manner for the purpose of fully and completely disclosing the principles of the invention. However, it is recognized that other forms and variations may occur to those skilled in the art. It should therefore be understood that while the preferred form was shown and described in detail, it is not the desire to so limit or narrow the invention beyond the broad general principles disclosed and as set forth in the appended claims.

What is claimed is:

1. An attachment for connecting a corn harvesting unit to a combine having a main mobile frame with fore-andaft spaced transverse frame portions supporting from underneath an elongated relatively narrow fore-and-aft combine body having a forwardly positioned crop-inlet opening, the corn harvesting unit having forwardly disposed harvesting mechanism, a centrally positioned conveyor extending rearwardly from the harvesting mechanism with a rear crop discharge outlet for feeding material into the crop-inlet, and outwardly extending structure adjacent the outlet forming a pair of axial alined horizontal trunnions projecting oppositely outwardly from the conveyor, said attachment comprising; an attachment frame composed of a pair of transversely spaced elongated frame members, each of the members having a fore-and-aft section disposed beneath the main frame of the combine and an upright section rigid with and extending upwardly from the forward end of the fore-and-aft section; means for mounting the fore-and-aft sections on the fore-and-aft spaced transverse portions of the main frame whereby the forward upright sections shall be disposed forwardly of and adjacent the combine body and spaced transversely on the order of the trunnions on the harvester conveyor; trunnion receiving means on the upper ends of each of the upright sections adaptable to receive the respective trunnions on the conveyor for permitting vertical movement of the harvesting unit relative to the combine; hydraulic means mounted on the lower ends of the upright sections; and means for connecting the hydraulic means to the corn harvesting unit to effect selective vertical adjustment of the unit.

2. An attachment for connecting a corn harvesting unit to a combine having a main mobile frame with fore-and-aft spaced transverse frame portions supporting from underneath an elongated relatively narrow fore-and-aft combine body having a forwardly positioned crop-inlet opening, the corn harvesting unit having forwardly disposed harvesting mechanism, a centrally positioned conveyor extending rearwardly from the harvesting mechanism with a rear crop discharge outlet for feeding material into the crop-inlet, and outwardly extending structure adjacent the outlet forming a pair of axial alined horizontal trunnions projecting oppositely outwardly from the conveyor, said attachment comprising; an attachment frame composed of a laterally disposed and elongated frame section beneath the main frame of the combine and an upright section rigid with and extending upwardly from the forward end of the laterally disposed section; means for mounting the sections on the fore-and-aft spaced transverse portions of the main frame whereby the forward upright section shall be disposed forwardly of and adjacent the combine body; trunnion receiving means on the upper end of the upright section adaptable to receive the respective trunnions on the conveyor for permitting vertical movement of the harvesting unit relative to the combine; hydraulic means mounted on the lower end of the upright section; and means for connecting the hydraulic means to the corn harvesting unit to effect selective vertical adjustment of the unit.

3. An attachment for connecting a corn harvesting unit to a combine having a main mobile frame with fore-and-aft spaced transverse frame portions supporting from underneath an elongated relatively narrow fore-and-aft combine body having a forwardly positioned crop-inlet opening, the corn harvesting unit having forwardly disposed harvesting mechanism, a centrally positioned conveyor extending rearwardly from the harvesting mechanism with a rear crop discharge outlet for feeding material into the crop-inlet, and outwardly extending structure adjacent the outlet forming a pair of axial alined horizontal trunnions projecting oppositely outwardly from the conveyor, said attachment comprising; an attachment frame composed of a laterally disposed and enlongated frame section beneath the main frame of the combine and an upright section rigid with and extending upwardly from the forward end of the laterally disposed section; means for mounting the sections on the fore-and-aft spaced transverse portions of the main frame whereby the forward upright section shall be disposed forwardly of an adjacent the combine body; and trunnion receiving means on the upper end of the upright section adaptable to receive the respective trunnions on the conveyor for permitting vertical movement of the harvesting unit relative to the combine.

4. The invention defined in claim 3 in which the trunnions and the trunnion receiving means support a transverse shaft coextensive axially with the trunnions, and further characterized by a sprocket mounted on the shaft, means extending from the main power source on the combine for driving the sprocket, and drive means extending forwardly from the shaft to the harvesting unit for operating the latter.

5. An attachment for connecting a corn harvesting unit to a combine having a main mobile frame including front and rear rigidly connected transverse beam portions supporting from underneath an elongated relatively narrow fore-and-aft combine body having a forwardly positioned crop-inlet opening, the corn harvesting unit being of the type having forwardly disposed harvesting mechanism and a centrally positioned conveyor extending rearwardly from the harvesting mechanism with a rear crop discharge outlet for feeding material through the crop-inlet, and outwardly extending structure adjacent the outlet forming a pair of axial alined horizontal trunnions projecting oppositely outwardly from the conveyor, said attachment comprising: an attachment frame composed of a pair of transversely spaced elongated frame members, each of the members having a fore-and-aft section disposed beneath the main frame of the combine, an upright section rigid with and extending upwardly from the forward end of the fore-and-aft section, and a transverse beam interconnecting the upright sections adapted to seat upon the front transverse beam portion of the main frame; means for connecting the fore-and-aft sections to the rear transverse beam portion of the main frame whereby the forward upright sections shall be disposed forwardly of and adjacent the combine body; trunnion receiving means on the upper end of each of the upright sections spaced on the order of and adapted to receive the respective trunnions on the harvesting unit for permitting vertical movement of the harvesting unit relative to the combine; and hydraulic means mounted adjacent the lower ends of the upright sections; and means for connecting the hydraulic means to the corn harvesting unit to effect selective vertical adjustment of the harvesting unit.

6. An attachment for connecting a corn harvesting unit to a combine having a main mobile frame including front and rear rigidly connected transverse beam portions supporting from underneath an elongated relatively narrow fore-and-aft combine body having a forwardly positioned crop-inlet opening, the corn harvesting unit being of the type having forwardly disposed harvesting mechanism and a centrally positioned conveyor extending rearwardly from the harvesting mechanism with a rear crop discharge outlet for feeding material through the crop-inlet, and outwardly extending structure adjacent the outlet forming a pair of axial alined horizontal trunnions projecting oppositely outwardly from the conveyor, said attachment comprising; an attachment frame composed of a pair of transversely spaced elongated frame members, each of the members having a fore-and-aft section disposed beneath the main frame of the combine, an upright section rigid with and extending upwardly from the forward end of the fore-and-aft section, and a transverse beam interconnecting the upright sections adapted to seat upon the front transverse beam portion of the main frame; means for connecting the fore-and-aft sections to the rear transverse beam portion of the main frame whereby the forward upright sections shall be disposed forwardly of and adjacent the combine body; and trunnion receiving means on the upper end of each of the upright sections spaced on the order of and adapted to receive the respective trunnions on the harvesting unit for permitting vertical movement of the harvesting unit relative to the combine.

7. An attachment for connecting a corn harvesting unit to a combine having a main mobile frame including front and rear rigidly connected transverse beam portions supporting from underneath an elongated relatively narrow fore-and-aft combine body having a forwardly positioned crop-inlet opening, the corn harvesting unit being of the type having forwardly disposed harvesting mechanism and a centrally positioned conveyor extending rearwardly from the harvesting mechanism with a rear crop discharge outlet for feeding material through the crop-inlet, and outwardly extending structure adjacent the outlet forming a pair of axial alined horizontal trunnions projecting oppositely outwardly from the conveyor, said attachment comprising: an attachment frame composed of a laterally disposed and elongated frame section beneath the main frame of the combine, an upright section rigid with and extending upwardly from the forward end of the laterally disposed section, and a transverse beam extending rearwardly from the upright section and adapted to seat upon the front transverse beam portion of the main frame; means for connecting the laterally disposed section to the rear transverse beam portion of the main frame whereby the forward upright section shall be disposed forwardly of and adjacent the combine body; and trunnion receiving means on the upper end of the upright section adapted to receive the trunnions on the harvesting unit for permitting vertical movement of the harvesting unit relative to the combine.

8. An attachment for connecting a corn harvesting unit to a combine having a main power source and a main mobile frame including front and rear rigidly connected transverse beam portions supporting from underneath an elongated relatively narrow fore-and-aft combine body having a forwardly positioned crop-inlet opening, the corn harvesting unit being of the type having forwardly disposed harvesting mechanism and a centrally positioned conveyor extending rearwardly from the harvesting mechanism with a rear crop discharge outlet for feeding material through the crop-inlet, and outwardly extending structure adjacent the outlet forming a pair of axial alined horizontal trunnions projecting oppositely outwardly from the conveyor, said attachment comprising: an attachment frame composed of a laterally disposed and elongated frame section beneath the main frame of the combine, an upright section rigid with and extending upwardly from the forward end of the laterally disposed section, and a transverse beam extending rearwardly from the upright section adapted to seat upon the front transverse beam portion of the main frame; means for connecting the laterally disposed section to the rear transverse beam portion of the main frame whereby the forward upright section shall be disposed forwardly of and adjacent the combine body; trunnion receiving means on the upper end of the upright section adapted to receive the trunnions on the harvesting unit for permitting vertical movement of the harvesting unit relative to the combine; hydraulic means mounted adjacent the lower ends of the upright sections; and means for connecting the hydraulic means to the corn harvesting unit to effect selective vertical adjustment of the harvesting unit; a shaft extensive coaxially with the trunnions; a sprocket mounted on the shaft; means for connecting the main power source to the sprocket for driving the latter; and drive means extendable forwardly from the shaft for operating the corn harvesting unit.

9. An attachment for connecting a corn harvesting unit to a combine having a main mobile frame with fore-and-aft spaced transverse frame portions supporting from underneath an elongated relatively narrow fore-and-aft combine body having a forwardly positioned crop-inlet opening, the corn harvesting unit having forwardly disposed harvesting mechanism, a conveyor extending rearwardly from the harvesting mechanism with a rear crop discharge outlet for feeding material into the crop-inlet, and structure adjacent the outlet forming a first part of horizontal trunnion means projecting from the conveyor, said attachment comprising; an attachment frame composed of a laterally disposed and elongated frame section beneath the main frame of the combine and an upright section rigid with and extending upwardly from the forward end of the laterally disposed section; means for mounting the sections on the fore-and-aft spaced transverse portions of the main frame whereby the forward upright section shall be disposed forwardly of and adjacent the combine body; and a second part of horizontal trunnion means on the upper end of the upright section adaptable to accommodate said first part of horizontal trunnion means on the conveyor for permitting vertical movement of the harvesting unit relative to the combine.

No references cited.

UNITED STATES PATENT OFFICE
CERTIFICATE OF CORRECTION

Patent No. 2,899,792 August 18, 1959

Joe H. Hoeksema

It is hereby certified that error appears in the printed specification of the above numbered patent requiring correction and that the said Letters Patent should read as corrected below.

Column 8, line 3, for "an adjacent" read -- and adjacent --; column 9, line 24, strike out "and".

Signed and sealed this 16th day of February 1960.

(SEAL)
Attest:
KARL H. AXLINE
Attesting Officer

ROBERT C. WATSON
Commissioner of Patents